April 7, 1959   J. W. KREUTTNER   2,880,752
AIR CONDITIONING APPARATUS
Filed April 23, 1953
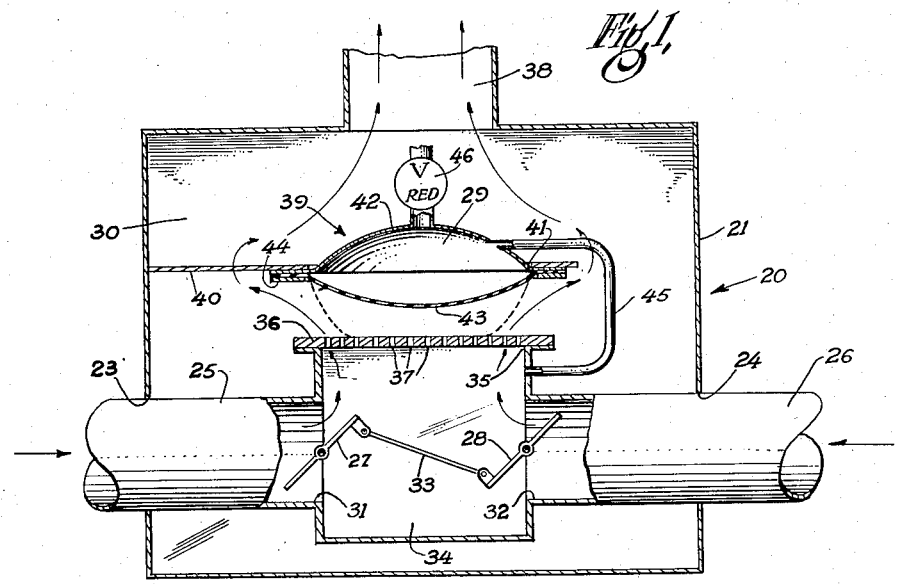
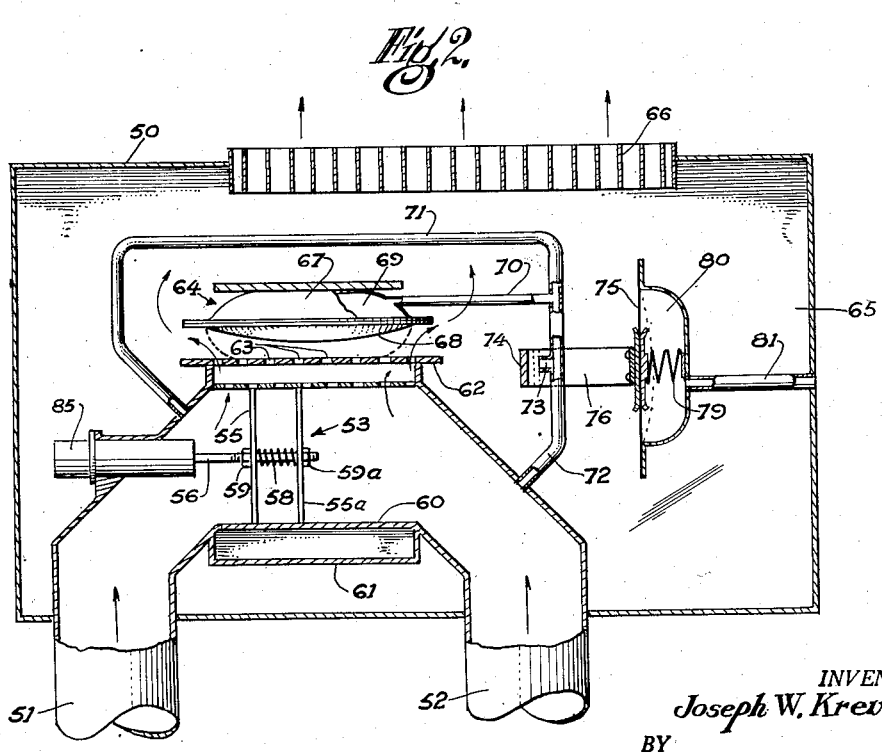
INVENTOR.
Joseph W. Kreuttner
BY
Pollard and Johnston
ATTORNEYS United States Patent Office 2,880,752
Patented Apr. 7, 1959

2,880,752
AIR CONDITIONING APPARATUS

Joseph W. Kreuttner, North Tarrytown, N.Y., assignor to Buensod-Stacey, Incorporated, New York, N.Y., a corporation of Delaware Application April 23, 1953, Serial No. 350,556

5 Claims. (Cl. 137—486)

This invention relates to air conditioning apparatus and more particularly to air flow control arrangements especially suitable for mixing and distributing air in a zone or room.

In many air conditioning systems wherein temperature may be selectively regulated in each zone conditioned, warm air and cold air are separately supplied to a distributing unit in which such warm air and cold air are mixed before being distributed into the zone. One of the objectionable features in such a system, especially high pressure air systems, has been the audible noises associated with operation of individual distributing units when the pressures in warm air and cold air supply ducts vary or differ, and particularly when existing flow conditions in such ducts are upset by variation in the proportional amounts of warm and cold air admitted into the zone. It has been found that such objectionable noises are avoided by maintaining a constant volume delivery of air into the room.

It is therefore an object of this invention to provide for use in air conditioning systems improved and quietly operating air distributing units.

Another object of this invention is to provide air distributing units which deliver air at a constant volume irrespective of pressure differences and variations in air supply.

A further object of this invention is to provide air distributing units for air conditioning systems with a flow control device operatively connected with selected pressure sources in the unit to automatically maintain constant volume air discharge, regardless of variation in the proportional amounts of warm and cold air used by the system to satisfy desired temperature requirements in the zones. A special feature of this invention is the simplified damper arrangement that may be employed with such pressure control device.

In air conditioning systems wherein air is heated and cooled at central conditioning apparatus and the warm air and cold air are thereafter distributed in separate ducts to a plurality of zones or rooms, an air distributing unit is usually provided in each zone for mixing warm air and cold air and for discharging the mixed air into the zone. In a zone air distributing unit according to the present invention, warm air and cold air are passed from the air supply ducts through a variable area opening common to both air supply ducts. Mixed air is then discharged from the unit into the zone through a suitable air outlet. Constant volume discharge through the mixed air outlet is maintained by regulating the size of the variable area opening in accordance with certain pressure conditions of air in the unit.

When existing flow conditions are upset, a flow control device responds to static pressure variations in the unit to vary the area of such opening in order to compensate for reduced or increased pressures and to maintain the volume flowing through the opening constant. In the preferred form, the constant volume device has a pressure responsive, expansible diaphragm overlying and movable to and from seating positions on the outlet side of a perforated resistance plate that defines the variable area opening. The resistance plate may also be of porous material such as felt, which would provide a straight-line relation between volume and pressure, thereby avoiding the usual P-V orifice characteristics.

In one embodiment the perforated resistance plate lies at the outlet of a proportioning and mixing chamber and forms a seat for a flexible diaphragm which is movable relative to the plate to control the number of free apertures in the plate, the diaphragm being responsive to pressure conditions of the mixed air on the inlet side of the plate. In this embodiment, a restricted vent, which may be operated either manually or by mixed air pressure on the outlet side of the plate, is provided for venting the diaphragm so as to insure deflation and accurate control of the diaphragm.

According to another embodiment of this invention, flow of air from the air supply ducts into the mixing chamber, is controlled by a damper arrangement, which directs warm and cold air through the perforated resistance plate before it enters the mixing chamber. In this instance the diaphragm that controls the size of the discharge area through the plate is actuated by air that is fed thereto through a manifold from both the warm air duct and the cold air duct, there also being a vent in the manifold which is controlled by another diaphragm responsive to pressure in the mixed air chamber.

These and other objects, features and advantages of the invention will become apparent from the following detailed description of the accompanying drawings, which are merely exemplary.

In the drawings:

Figure 1 is a vertical longitudinal section through an air distributing unit embodying this invention; and Figure 2 is a vertical longitudinal section of another embodiment of the invention.

Referring now to Figure 1, an air distributing unit, generally indicated at 20, includes a casing 21 having apertures 23 and 24 in opposing side walls thereof for respectively receiving a warm air supply duct 25 and a cold air supply duct 26. In air conditioning systems, wherein warm air and cold air are conditioned at central conditioning apparatus, and are distributed through separate ducts to air distributing units in each zone to be conditioned, the temperature of the air entering the zone may be selectively regulated by varying the proportional amounts of warm and cold air admitted from the air supply ducts into the zone. Such proportioning may be effected by a pair of dampers 27 and 28 which control flow of air from outlet ports 31 and 32 of air supply ducts 25 and 26, respectively. The dampers are moved coordinately by an interconnecting articulated link 33 so that as one damper is moved to admit air, or more air, from one of the air supply ducts, the other damper is moved to restrict the flow of air from the other supply duct. Likewise, when the one damper is moved towards fully closed position, the other is moved towards a fully open position.

The warm and cold air passes from air supply ducts 25 and 26 into air proportioning and mixing chamber 34, which feeds the air through a top opening 35 into a mixed air compartment 30. Air is then discharged into the zone through opening 38.

In order to maintain the volumetric discharge through opening 38 substantially constant, a device is provided in the unit which controls air flow through opening 35 in such a manner that when certain pressures in the unit increase and tend to increase volumetric discharge, the open area of opening 35 is accordingly reduced to compensate for such increased pressure, thereby maintaining the volume flowing through the opening constant. In a like manner, this device increases the open area of opening 35 when certain pressures in the unit decrease. In the preferred arrangement illustrated, this device includes a diaphragm member 39 and an apertured resistance plate 36 which covers opening 35 and provides a pressure difference between air proportioning and mixing chamber 34 and mixed air compartment 30. The air from the supply ducts is thus forced to flow through the apertures 37 in plate 36 before it is discharged into the zone.

The diaphragm member comprises an upper case 42 of rigid material and a lower flexible membrane 43, which overlies apertured plate 36 in vertical spaced relation thereto. The case has a convex portion that protrudes upwardly through an opening 41 in a wall bracket 40, and has substantially flat peripheral margins extending laterally beyond the edges of said opening so as to abut the underside surface of the bracket when the convex portion is inserted into the bracket opening. The peripheral margins of membrane 43 are held against the peripheral margins of the case by a frame 44 which is attached, as by rivets, to bracket 40 to hold membrane 43 and case 42 in assembled relation in the unit. In their assembled position, the membrane and case define a pressure chamber 29, which is in open communication through a conduit 45 with the mixed air at the inlet side of resistance plate 36. In this way, static pressure increases in the air proportioning and mixing chamber will cause the membrane 43 to flex downwardly, as shown in broken lines, and bear against resistance plate 36, thereby closing some of the apertures 37 and reducing the free passage area in the plate. The amount of free passage through the plate will thereby vary continuously in accordance with the pressure in chamber 34. In order to avoid trapping air in chamber 34, which would otherwise occur and prevent reopening of the apertures in the plate if pressure in chamber 34 became excessive, the diaphragm may be provided with a limiting stop member, or may be suitably designed by properly dimensioning the membrane in relation to the size of the plate, so that the diaphragm will never close all the apertures in the plate, but will leave a predetermined minimum free passage area to maintain some flow at all times.

Bleed valve 46 is provided for reducing pressure in chamber 29. This valve may be manually operated to control the initial setting of the diaphragm 43 relative to plate 36. Furthermore, valve 46 may be also controlled by a diaphragm (not shown) responsive to static pressure in chamber 21 in order to obtain more exact control of the volumetric discharge from the air distributing unit 20.

A modified arrangement is shown in Figure 2 which includes a casing 50 having a warm air supply duct 51 and a cold air supply duct 52 connected to opposite ends of a straight-line air control damper arrangement 53. The damper arrangement 53 includes a reciprocating plunger 56 actuated by a motor 85, for example, an air motor, which may be thermostatically controlled in response to zone temperature. The plunger carries a pair of dampers 55 and 55a, which are slidably mounted on plunger 57 between spaced adjustable abutments 59 and 59a. The abutments are shown in the form of nuts threaded on the plunger. The dampers are normally spaced apart by spring 58, which urges each damper to bear against its respective adjacent abutment. The dampers are movable linearly in a duct 60 which is perforated along its upper portion to admit air from air supply ducts 51 and 52 into air mixing compartment 65. Air is discharged from the mixing compartment 65 through louvers 66. The position of dampers 55 and 55a in duct 60 will determine the relative amounts of air admitted from each supply duct.

The particular mounting of the dampers on plunger 56 permits overtravel of the plunger when one of the dampers closes so that the other damper can be moved to its fully open position only after such closing of the one damper. During such overtravel, spring 58 is compressed by movement of such other damper to its fully open position. Then, when the plunger is moved to open the closed damper, initial movement of the plunger releases compressed spring 58, thereby moving the open damper relative to the closed damper so as to partially close it before the closed damper opens. In this way the total volume of air admitted from both air supply ducts at any time never exceeds the volume admitted by a fully open damper.

A resistance or control plate 62 forms part of an annular wall 61 which encircles duct 60 in spaced relation thereto. Plate 62 is formed with apertures 63 through which the air flowing from the air supply ducts must pass to enter air mixing chamber 65.

Diaphragm member 64 is similar to that described in Figure 1 and includes an upper case 67 of rigid material and a lower flexible membrane 68 that overlies resistance plate 62 and is expandable in a direction towards this plate. Pressure chamber 69, which is formed by the case 67 and membrane 68, is connected with each air supply duct by a manifold 70. A branch 71 of the manifold connects with warm air supply duct 51, and a branch 72 of the manifold connects with cold air supply duct 52. The manifold is normally vented to mixing chamber 65 by orifice 73. Flow through the orifice 73 is controlled by a valve plate 74 movable to and from a seating position closing such orifice by a pressure operated diaphragm 75, which is connected to the plate by elongated valve stem 76. Diaphragm 75 is subjected on one side to static pressure in air mixing chamber 65 and to atmospheric pressure on its other side, the diaphragm chamber 80 being open to the atmosphere through vent 81. A spring 79 is provided in chamber 80 and normally acts against the diaphragm to unseat valve plate 74.

In this way, membrane 68 is controlled by static pressure of the mixed air in chamber 65, the orifice 73 closing when such pressure increases so that the air pressures in air supply ducts 51 and 52 are transmitted to diaphragm 64 to dilate or extend membrane 68. As it expands, it seats on resistance plate 62 and closes some of apertures 63, thereby reducing air flow through the plate into mixing chamber 65. Of course, the number of apertures closed will vary with the pressures in the air supply ducts so that air flow into mixing chamber 65 and the zone being conditioned will be maintained substantially constant.

When air flow through louvers 66 starts falling off, static pressure in mixing chamber 65 decreases and releases diaphragm 75. Spring 79 returns this diaphragm to its normal unstressed state, thereby displacing valve plate 74 from its seating position and opening orifice 73. Manifold 70 is vented and pressure in chamber 69 is released so as to deflate membrane 68 and open more apertures 63 in resistance plate 62. Thus, when there is static pressure variation in the air mixing chamber of the distributing unit that would otherwise result in reduced air flow into the zone, the free passage area through resistance plate 65 is increased to allow the same amount of air to flow therethrough under the changed pressure conditions.

It should be apparent that various details of construction can be changed without departing from the spirit of the invention as defined in the appended claims.

What is claimed is:

1. In a zone air distributing unit for air conditioning apparatus having a casing with a warm air inlet port and a cold air inlet port to admit warm and cold air respectively, damper means for said ports to proportion selectively the air admitted from the respective ports, the combination including a mixed air inlet chamber receiving air from said warm and cold air ports a mixed air outlet to discharge mixed air to a zone, flow control means including restricted passage plate passageway means positioned to be traversed by air admitted from said mixed air inlet chamber and passing to said outlet, said plate means being across said outlet and resisting free flow of air from said mixed air inlet chamber, and power operated pressure responsive means movable against said plate means in response to pressure increase to vary the size of said passageway means so as to control the volume delivery to said outlet, said pressure responsive means including air connection means to the upstream side of said plate means.

2. In a zone air distributing unit for air conditioning apparatus having a casing with a warm air inlet port and a cold air inlet port to admit warm and cold air respectively, damper means for said ports to proportion selectively the air admitted from the respective ports, the combination including a mixed air inlet chamber receiving air from said warm and cold air ports, a mixed air outlet port to discharge mixed air to a zone, means confining and directing air flowing from said inlet means to said outlet port, a pervious resistance plate in position in said latter means to be traversed by such air from said inlet means to said outlet port, fluid pressure operated means associated with said plate to limit free passage area through the plate, means for connecting inlet air from the upstream side of said plate to said fluid pressure operated means, and pilot valve means connected with said fluid pressure operated means responsive to pressure on the downstream side of said plate for venting air from said fluid pressure operated means so as to maintain constant volume delivery to the outlet port.

3. In an air distributing unit for air conditioning apparatus having a casing with a warm air inlet port and a cold air inlet port to admit warm and cold air respectively, and damper means for said ports to proportion selectively the air admitted from said ports, the combination including a mixed air outlet port to discharge mixed air, flow control means including an apertured resistance plate in position to be traversed by air flowing from said inlet means to said outlet port, the apertures in said plate defining a variable area orifice, a resilient, pressure responsive diaphragm overlying said plate in spaced relation to the outlet side of the orifice defined by the apertures, air connection means between said warm air inlet port, cold air inlet port and said pressure responsive diaphragm, and pilot valve means connected with said air connection means for venting air from said fluid pressure operating means so that said diaphragm will be expandable to and from seating positions on said plate to limit the number of open apertures in the plate so as to maintain constant volume delivery to said outlet port.

4. In a zone air distributing unit for air conditioning apparatus, the combination comprising an air mixing chamber, an air distributing chamber, said air mixing chamber having an opening passing air into said air distributing chamber, said air distributing chamber having an outlet to discharge mixed air into the zone, an apertured resistance plate covering the air mixing chamber opening, a closed pressure chamber overlying said plate on the outlet side of apertures in the plate and communicating with said mixed air chamber, said pressure chamber having a flexible diaphragm movable to and from seating positions on said resistance plate closing apertures in said plate in accordance with air pressure in said air mixing chamber, air connection means between the upstream side of said plate and said pressure chamber, and pilot valve means connected to said pressure chamber so that air will leak off from said pressure chamber.

5. In a zone air distributing unit for air conditioning apparatus, the combination including an air mixing chamber receiving air from inlet duct means comprising a warm air inlet and a cold air inlet and damper means for said inlets to proportion flow therefrom, a mixed air chamber, flow control means including a resistance plate extending across and positioned to be traversed by air flow from said mixing chamber to said mixed air chamber, a closed pressure chamber overlying said plate on the outlet side of the apertures in the plate and communicating with said inlet duct means, said pressure chamber having a diaphragm expandable to and from seated positions on the downstream side of said plate closing apertures in said plate, air connection means between said inlet duct means on the upstream side of said plate and said diaphragm, vent means leaking air from said pressure chamber, and yieldable means normally opening said vent means but movable toward a position closing said vent means when pressure in said mixed air chamber increases.

References Cited in the file of this patent

UNITED STATES PATENTS

| | | |
|---|---|---|
| 848,739 | Gut | Apr. 2, 1907 |
| 1,426,718 | De Florey | Aug. 22, 1922 |
| 1,725,375 | Rush | Aug. 20, 1929 |
| 1,814,530 | Spence | July 14, 1931 |
| 1,851,062 | Protzer | Mar. 29, 1932 |
| 2,192,042 | Hoffmann | Feb. 27, 1940 |
| 2,291,731 | Lake | Aug. 4, 1942 |
| 2,314,569 | Baker | Mar. 23, 1943 |
| 2,317,717 | Bauman | Apr. 27, 1943 |
| 2,517,056 | Trubert | Aug. 1, 1950 |
| 2,542,279 | Kempton | Feb. 20, 1951 |
| 2,558,962 | Kempton | July 3, 1951 |
| 2,577,967 | Hughes | Dec. 11, 1951 |
| 2,620,983 | Lyman | Dec. 9, 1952 |
| 2,720,151 | Kreuttner | Oct. 11, 1955 |

FOREIGN PATENTS

| | | |
|---|---|---|
| 28,478 | Great Britain | of 1909 |
| 897,639 | Germany | Nov. 23, 1953 |